(12) United States Patent
Shingaki et al.

(10) Patent No.: US 12,602,612 B2
(45) Date of Patent: Apr. 14, 2026

(54) INFORMATION PROCESSING DEVICE, INFORMATION PROCESSING METHOD, AND COMPUTER PROGRAM PRODUCT FOR EVALUATING PERFORMANCE OF MACHINE LEARNING MODEL

(71) Applicant: KABUSHIKI KAISHA TOSHIBA, Tokyo (JP)

(72) Inventors: Ryusei Shingaki, Tokyo (JP); Takashi Koiso, Kawasaki Kanagawa (JP); Kosuke Naruse, Tokyo (JP); Hideki Ueno, Urayasu Chiba (JP); Yoshikazu Ooba, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 896 days.

(21) Appl. No.: 17/899,519

(22) Filed: Aug. 30, 2022

(65) Prior Publication Data

US 2023/0237373 A1     Jul. 27, 2023

(30) Foreign Application Priority Data

Jan. 27, 2022    (JP) ................................. 2022-010589

(51) Int. Cl.
*G06N 20/00*           (2019.01)

(52) U.S. Cl.
CPC .................................... *G06N 20/00* (2019.01)

(58) Field of Classification Search
CPC .................................. G06N 20/00; G06N 7/01
See application file for complete search history.

(56) References Cited

U.S. PATENT DOCUMENTS

| | | | |
|---|---|---|---|
| 12,383,196 B2 * | 8/2025 | Etkin ...................... | A61B 5/377 |
| 2006/0173663 A1 * | 8/2006 | Langheier .............. | G16H 50/20 |
| | | | 703/11 |

(Continued)

FOREIGN PATENT DOCUMENTS

| | | |
|---|---|---|
| JP | 2019-125260 A | 7/2019 |
| JP | 2020-95477 A | 6/2020 |

(Continued)

OTHER PUBLICATIONS

Japan Patent Office, Office Action in JP App. No. 2022-010589, 2 pages, with machine translation, 4 pages (Jan. 28, 2025).

(Continued)

*Primary Examiner* — Ryan Barrett
(74) *Attorney, Agent, or Firm* — Finnegan, Henderson, Farabow, Garrett & Dunner, LLP

(57) ABSTRACT

An information processing device includes a hardware processor. The processor functions to generate first data to be input to a model used for deducing an effect of a case where a measure is executed with input of observation data. The first data represents the observation data obtained without execution of the measure. The processor functions to receive first parameters affecting the effect. Each first parameter is used in an estimation process of estimating the observation data when the measure is executed. The processor functions to execute the estimation process and generate second data representing the observation data. The processor functions to estimate the effect by using the first/second data. The processor functions to learn the model by using the first/second data. The processor functions to evaluate performance of the learned model by comparing the effect estimated by using the first/second data and the effect estimated by the learned model.

8 Claims, 7 Drawing Sheets

(56)                    References Cited

U.S. PATENT DOCUMENTS

| | | | |
|---|---|---|---|
| 2017/0037475 A1* | 2/2017 | Ho | C12Q 1/6883 |
| 2017/0083682 A1* | 3/2017 | McNutt | A61N 5/1031 |
| 2019/0051398 A1* | 2/2019 | Zankowski | G06N 20/00 |
| 2019/0303716 A1* | 10/2019 | Marwah | G06F 18/2135 |
| 2020/0206533 A1* | 7/2020 | Laaksonen | G06N 7/01 |
| 2021/0027191 A1* | 1/2021 | Sinha | G06N 5/045 |
| 2022/0076164 A1* | 3/2022 | Conort | G06N 20/00 |
| 2022/0084678 A1* | 3/2022 | Kelm | G06N 5/01 |
| 2022/0351075 A1* | 11/2022 | Bastani | G06N 20/00 |
| 2023/0044620 A1* | 2/2023 | Shochat | G06T 7/0012 |
| 2023/0418654 A1* | 12/2023 | Zuccarelli | G06N 5/01 |
| 2025/0054633 A1* | 2/2025 | Jameel | G16H 70/20 |

FOREIGN PATENT DOCUMENTS

| | | | |
|---|---|---|---|
| JP | 6744946 B2 | 8/2020 | |
| JP | 2020-149251 A | 9/2020 | |

OTHER PUBLICATIONS

S. Athey, et al., "Generalized Random Forests," The Annals of Statistics, vol. 47, No. 2, pp. 1148-1178 (2019).
S. Athey, et al., "Recursive partitioning for heterogeneous causal effects," Proc. of the Nat'l Acad. of Scis., vol. 113, No. 27, pp. 7353-7360 (2016).
S. Wager, et al., "Estimation and Inference of Heterogeneous Treatment Effects Using Random Forests," J. of the Am. Statistical Assoc., vol. 113, No. 523, pp. 1228-1242 (2018).

* cited by examiner

FIG.3

| ROAD | SELECTION PROBABILITY (BEFORE MEASURE EXECUTION) | SELECTION PROBABILITY (AFTER MEASURE EXECUTION) |
|---|---|---|
| R1 | 30% | 40% |
| R2 | 70% | 60% |
| ⋮ | ⋮ | ⋮ |

START

S301

LEARN SELECTED MACHINE LEARNING MODEL

S302

ESTIMATE EFFECTS OF MEASURE WITH RESPECT TO
MEASURE-OPERATION TRAFFIC FLOW DATA BY
USING LEARNED MACHINE LEARNING MODEL

END

INFORMATION PROCESSING DEVICE, INFORMATION PROCESSING METHOD, AND COMPUTER PROGRAM PRODUCT FOR EVALUATING PERFORMANCE OF MACHINE LEARNING MODEL

CROSS-REFERENCE TO RELATED APPLICATIONS

This application is based upon and claims the benefit of priority from Japanese Patent Application No. 2022-010589, filed on Jan. 27, 2022; the entire contents of which are incorporated herein by reference.

FIELD

Embodiments described herein relate generally to an information processing device, an information processing method, and a computer program product.

BACKGROUND

A technique of applying a machine learning model to an estimation problem of causal effects has been proposed. For example, by using observation data corresponding to an execution result of a certain measure, effects of the measure are estimated by a machine learning model.

However, in such a technique, it has been difficult in some cases to verify the performance of the machine learning model.

BRIEF DESCRIPTION OF THE DRAWINGS

FIG. 3 is a diagram illustrating an example of set selection probabilities.

DETAILED DESCRIPTION

Figure 1:
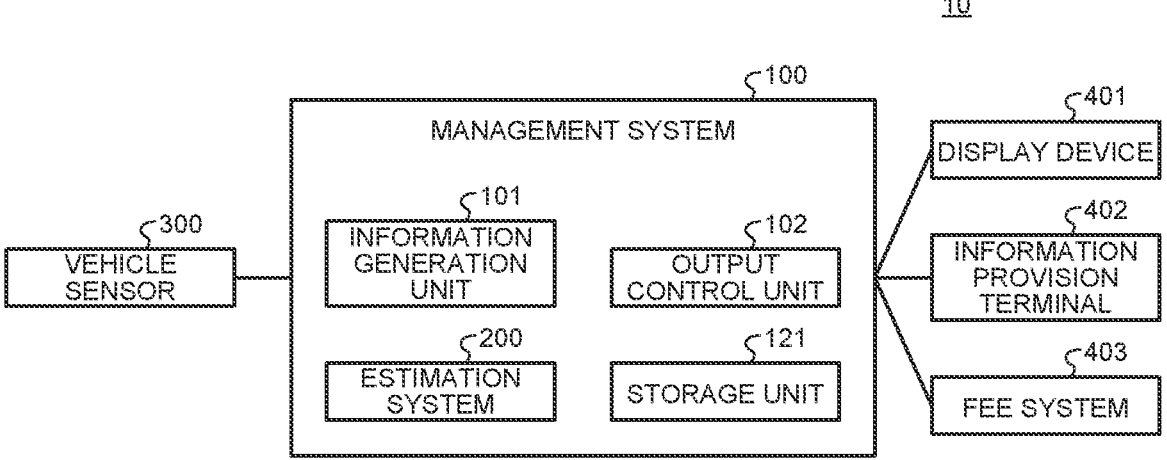
FIG. 1 is a block diagram of a traffic control system.

An information processing device according to one embodiment includes one or more hardware processors. The one or more hardware processors are configured to generate first data to be input to one or more models. Each model is used for deducing an effect of a case where a measure is executed with input of observation data. The observation data varies depending on whether the measure is executed or not. The first data represents the observation data obtained in a case where the measure is not executed. The hardware processors receive input of one or more first parameters affecting the effect. Each first parameter is a parameter used in an estimation process of estimating the observation data in the case where the measure is executed. The hardware processors execute the estimation process by using the received first parameter and generate second data representing the observation data estimated by the estimation process. The hardware processors estimate the effect by using the first data and the second data. The hardware processors learn the one or more models by using learning data including the first data and the second data. The hardware processors evaluate performance of the learned one or more models, by comparing the estimated effect and the effect estimated by the learned one or more models.

Hereinafter, with reference to accompanying drawings, a preferred embodiment of an information processing device according to this invention will be described in detail.

Hereinafter, an example of a traffic control system that provides a service such as traffic congestion prediction using traffic flow data (an example of observation data) and a machine learning model will be mainly described. An applicable system is not limited to the traffic control system. The embodiment can be applied to any system as long as the system inputs observation data to a machine learning model and deduces effects of a case where a measure is executed. The observation data is not limited to traffic flow data as long as the data varies depending on whether the measure is executed or not.

Many transportation companies and local governments are collecting traffic big data extensively. Traffic measures (hereinafter, referred to as "measures") such as provision of traffic congestion prediction services based on the traffic big data, dynamic pricing that varies tolls depending on traffic (traffic congestion) conditions, and traffic regulations based on the idea of Evidence Based Policy Making (EBPM) have been actively studied.

One major objective of the provision of the traffic congestion prediction services and the dynamic pricing is to control traffic congestion by dispersing traffic flows.

When a measure such as the provision of the traffic congestion prediction service or the dynamic pricing is actually executed, an effect of controlling traffic congestion is expected since drivers of running vehicles make behavior transformations such as bypassing actions.

In order to precisely estimate the traffic-congestion control effects from the traffic flow data, the measure has to be randomly executed, and the difference in the traffic volumes between the case w % here the measure is executed and the case where the measure is not executed has to be calculated. However, comparative tests of randomly executing the measure cannot be always carried out.

When the measure cannot be randomly executed, execution necessity of the measure depends on factors such as traffic conditions and weather around a target zone, and these factors affect the traffic volumes of the target zone. A problem in which the influence of confounding factors behind both the practicability of the measure and the traffic volume in the target zone is adjusted to estimate traffic-congestion control effects of the measure can be considered as an estimation problem of causal effects.

As described above, the technique of applying a machine learning model to an estimation problem of causal effects has been proposed. However, it has been difficult to verify the performance (or adequacy) of such a machine learning model in some cases. For example, the adequacy of the method of estimating causal effects by using a machine learning model is exhibited under a theoretical assumption. However, it is not guaranteed that actual data satisfies the assumption. Therefore, it is difficult to confirm whether the effects estimated by using the machine learning model are appropriate or not.

In the present embodiment, verification of the performance of a machine learning model is enabled by comparing the effects of a measure estimated by an estimation process different from that of the machine learning model and the effects of the measure estimated by the machine learning model.

In the estimation process, parameters are set, which are expected to vary when the measure is executed. The parameter is, for example, respective selection probabilities of plural routes (or roads). The estimation process is executed in accordance with those parameters (selection probabilities), and traffic flow data of the case where the measure is executed is estimated. The traffic flow data of the case where the measure is executed and the traffic flow data of the case where the measure is not executed are compared with each other to estimate the effects of the measure. Then, the effects of the measure estimated by the estimation process are compared with the effects of the measure estimated by the machine learning model.

The machine learning model is a model to which the traffic flow data varying depending on whether or not the measure is executed is input. The model is learned so as to deduce effects of the case where the measure is executed. For example, the machine learning model with which the effects having a small difference from the effects estimated by the estimation process have been obtained can be verified as a model that can estimate the effects of the measure at least at an equivalent level to the estimation process.

FIG. 1 is a block diagram illustrating an example of a configuration of a traffic control system 10 according to the present embodiment. As illustrated in FIG. 1, the traffic control system 10 includes a management system 10, a vehicle sensor 300, a display device 401, an information provision terminal 402, and a fee system 403. The constituent elements are connected via, for example, a network such as the Internet. The network may be any of a wireless network, a wired network, and a network including both of a wireless network and a wired network.

The vehicle sensor 300 senses vehicles running on roads and outputs, to the management system 100, traffic flow data based on the sensing results. The traffic flow data is data representing the traffic flows of the roads and, for example, includes average kilometers per hour of the vehicles in a target zone, the number of vehicles that run in the target zone in unit time, etc. The number of vehicles in the unit time may be referred to as a traffic volume. One vehicle sensor 300 is illustrated In FIG. 1, whereas the traffic control system 10 may be provided with plural vehicle sensors 300. For example, the plural vehicle sensors 300 may be installed at the roadside of the roads.

The display device 401 is a device that displays display information transmitted from the management system 100. Examples of the display device 401 include a large display provided in a traffic control room in which the management system 100 is installed, a large display provided in a rest area, parking area, etc., and an electronic message board installed above a road. The display information is, for example, information representing traffic conditions (traffic information) such as the time required to a particular point and traffic congestion information.

The information provision terminal 402 is a terminal device with which the information transmitted from the management system 100 is supplied. Examples of the information provision terminal 402 include an information provision terminal installed in a rest area and a parking area, a mobile terminal (smartphone, mobile phone, etc.) owned by a road user, and a car navigation device.

The fee system 403 is a system that manages usage fees of roads. The fee system 403, for example, carries out dynamic pricing that changes the usage fees of roads depending on the traffic information transmitted from the management system 100. The dynamic pricing, for example, increases the usage fees of the roads where traffic congestion is occurring and reduces the usage fees of the roads where traffic congestion is not occurring. By virtue of this, vehicles can be guided to the roads where traffic congestion is not occurring, and occurrence of traffic congestion can be controlled.

In FIG. 1, one display device 401, one information provision terminal 402, and one fee system 403 are illustrated. However, the traffic control system 10 may be provided with plural display devices 401, plural information provision terminals 402, and plural fee systems 403.

The management system 100 is a system that controls various processing as to traffic control. The management system 100 is sometimes referred to as a center processing device, a central processing device, or the like. The management system 100 is provided with a storage unit 121, an information generation unit 101, an output control unit 102, and an estimation system 200.

The management system 100 or the estimation system 200 corresponds to an information processing device. The management system 100 is implemented as, for example, a server device provided in the traffic control room. Part or all of the functions of the management system 100 may be built in a cloud environment.

The storage unit 121 stores various data used in the management system 100. For example, the storage unit 121 stores traffic flow data transmitted from the vehicle sensor 300, and parameters of the machine learning model used in the estimation system 200, etc. The estimation system 200 may be provided with a storage unit that stores, for example, parameters of the machine learning model.

Examples of the storage unit 121 include generally-used various storage media such as a flash memory, a memory card, a Random Access Memory (RAM), a Hard Disk Drive (HDD), and an optical disk.

The information generation unit 101 generates the display information displayed by the display device 401 and traffic information transmitted to, for example, the information provision terminal 402 and the fee system 403. For example, the information generation unit 101 determines whether or not traffic congestion is occurring in the target zone by using the traffic flow data obtained from the vehicle sensor 300, and generates traffic information representing determination results. A method of determining whether traffic congestion is occurring or not may be any method. For example, a method that determines traffic congestion when the number of vehicles is larger than a threshold value or when an average speed is lower than a threshold value can be used.

The output control unit 102 controls output of information to devices such as the display device 401, the information provision terminal 402, and the fee system 403. For example, the output control unit 102 outputs the display information, which is generated by the information generation unit 101, to the display device 401. The output control unit 102 also outputs the traffic information, which is generated by the information generation unit 101, to the information provision terminal 402 and the fee system 403.

In the present embodiment, the output control unit 102 controls the output of the information corresponding to the measure that has been confirmed to have effects by the estimation system 200. Examples of the measure include a change of the display information with respect to the display device 401, a change of the traffic information output to the information provision terminal 402, a change of media that provide information, and a change of a fee structure in the fee system 403. The change of the media that provide information means, for example, a change of the output destination to which information is provided, that is, one or more display devices 401 and one or more information provision terminals 402.

The estimation system 200 is a system that estimates the effects of the case where the measure for controlling the traffic flow is executed.

Figure 2:
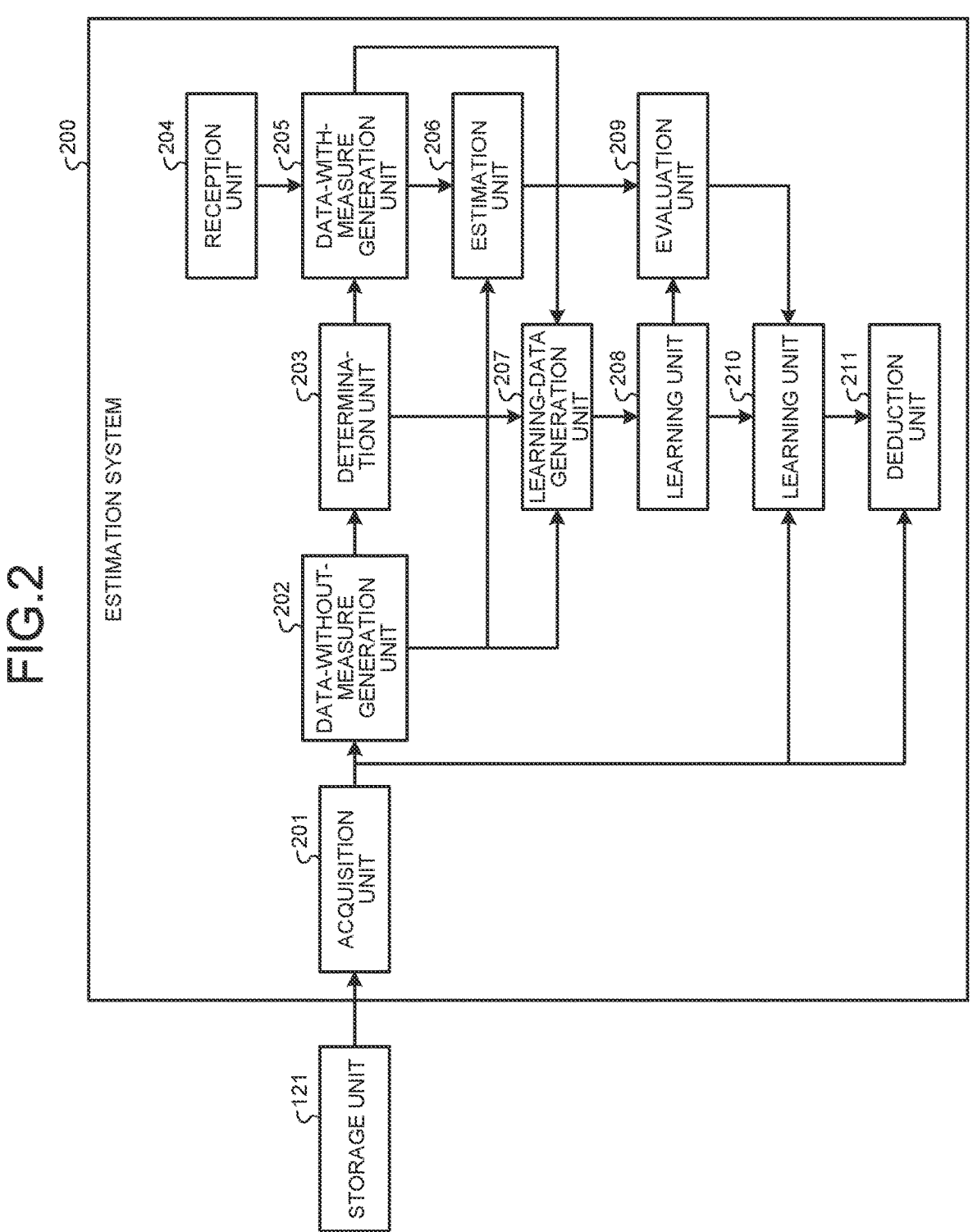
FIG. 2 is a block diagram illustrating an example of a configuration of an estimation system.

FIG. 2 is a block diagram illustrating an example of a configuration of the estimation system 200. As illustrated in FIG. 2, the estimation system 200 is provided with an acquisition unit 201, a data-without-measure generation unit 202 (an example of the first generation unit), a determination unit 203, a reception unit 204, a data-with-measure generation unit 205 (an example of the second generation unit), an estimation unit 206, a learning-data generation unit 207, a learning unit 208 (an example of the first learning unit), an evaluation unit 209, a learning unit 210 (an example of the second learning unit), and a deduction unit 211.

The acquisition unit 201 acquires various data used in various processing carried out by the estimation system 200. For example, the acquisition unit 201 reads the traffic flow data that is transmitted from the vehicle sensor 300 and stored in the storage unit 121. The traffic flow data transmitted from the vehicle sensor 300 includes the traffic flow data collected when operation of the measure has not been started (hereinafter, also referred to as pre-measure-operation traffic flow data) and the traffic flow data collected when operation of the measure has been started (hereinafter, also referred to as measure-operation traffic flow data). The acquisition unit 201 outputs the traffic flow data to the units that require this data.

Note that "operation of the measure has been started" means starting the process of executing the measure, which has the effects confirmed by the estimation system 200, in accordance with the actually collected traffic flow data. Even after the operation of the measure has been started, for example when the traffic conditions do not cause traffic congestion, the measure is not executed in some cases.

The data-without-measure generation unit 202 generates traffic flow data of a case where the measure is not executed (an example of the first data) by using the pre-measure-operation traffic flow data. Hereinafter, the traffic flow data of the case where the measure is not executed is referred to as traffic flow data DA. The traffic flow data DA is used in a determination process of the execution necessity of the measure by the determination unit 203. The traffic flow data DA is used also as the data that is input to the machine learning model.

As described above, when the operation of the measure has not been started, the acquisition unit 201 acquires the pre-measure-operation traffic flow data from the storage unit 121. The pre-measure-operation traffic flow data is data representing the traffic flow data of certain time and is not necessarily the data of the date and time slot that completely matches the traffic conditions that are an estimation target of the effects of the measure. In other words, the pre-measure-operation traffic flow data acquired by the acquisition unit 201 may vary.

Therefore, the data-without-measure generation unit 202 generates the traffic flow data DA by executing an estimation process using the pre-measure-operation traffic flow data. For example, the data-without-measure generation unit 202 generates a preliminarily-specified number of pieces of the traffic flow data DA based on the pre-measure-operation traffic flow data. Applicable examples of a method of generating the traffic flow data DA include a method using a traffic flow simulator and a generation method by Monte Carlo simulation based on a statistical model. The preliminarily-specified number of pieces is, for example, the number of days or time slots.

One or more parameters (an example of the second parameters) used in the estimation process carried out by the data-without-measure generation unit 202 can be configured so that a user can specify the parameter and the parameter can be received by the later-described reception unit 204. For example, in a case where variations in the pre-measure-operation traffic flow data acquired by the acquisition unit 201 are permitted, the data-without-measure generation unit 202 may generate the traffic flow data DA by using the acquired pre-measure-operation traffic flow data without change.

The determination unit 203 determines the execution necessity of the measure by using the traffic flow data DA. For example, the determination unit 203 determines whether or not traffic congestion is occurring in the target zone, by using the traffic flow data DA. Then, in response to determining that the traffic congestion is occurring, the determination unit 203 determines that execution of the measure is necessary.

When the execution of the measure is determined to be necessary, the reception unit 204 receives input of one or more parameters (an example of the first parameters) used in the estimation process carried out by the data-with-measure generation unit 205. The estimation process carried out by the data-with-measure generation unit 205 is a process of estimating the traffic flow data of the case where the measure is executed. The parameters are parameters that are expected to vary when the measure is executed, in other words, parameters that affect the effects of the measure.

For example, when the estimation process carried out by the data-with-measure generation unit 205 is implemented by the traffic flow simulator, selection probabilities of roads, selection probabilities of departure time slots, and fee structure settings can be used as the parameters. Hereinafter, an example in which the selection probabilities of roads are set as the parameters will be mainly described.

FIG. 3 is a diagram illustrating an example of the set selection probabilities of roads. FIG. 3 illustrates a setting example of the selection probabilities before the execution of the measure and the selection probabilities after the execution of the measure with respect to two roads R1 and R2.

As described above, the reception unit 204 may be configured to receive input of the parameters to be used in the estimation process that is carried out by the data-without-measure generation unit 202.

The data-with-measure generation unit 205 executes the estimation process by using the parameters (for example, the selection probabilities of roads) received by the reception unit 204 and generates traffic flow data (an example of the second data) of the case where the measure is executed. Hereinafter, the traffic flow data of the case where the measure is executed will be referred to as traffic flow data DB. Applicable examples of a method of generating the traffic flow data DB include a method using the traffic flow simulator and a generation method by the Monte Carlo simulation based on a statistical model.

In a case where the estimation process utilizing the traffic flow simulator is executed, the data-with-measure generation unit 205 changes selection probabilities of roads out of the parameters, which are necessary in the traffic flow simulator, to the received selection probabilities. Then, the data-with-measure generation unit 205 executes the estimation process without changing other parameters. In a case where the estimation process utilizing the Monte Carlo simulation is executed, the data-with-measure generation unit 205 changes the selection probabilities of roads out of the parameters, which are necessary in the Monte Carlo simulation, to the received selection probabilities and executes the estimation process without changing other parameters.

The estimation unit 206 estimates the effects of the measure by comparing the traffic flow data DA generated by the data-without-measure generation unit 202 with the traffic flow data DB generated by the data-with-measure generation unit 205. For example, the estimation unit 206 estimates, as the effects of the measure, the difference between the average kilometers per hour included in the traffic flow data DA and the average kilometers per hour included in the traffic flow data DB, or the difference between the number of vehicles included in the traffic flow data DA and the number of vehicles included in the traffic flow data DB.

The learning-data generation unit 207 generates learning data used in learning of the machine learning model. For example, the learning-data generation unit 207 generates learning data that determines, on the basis of the determination result of the execution necessity of the measure by the determination unit 203, which of the traffic flow data DA and the traffic flow data DB is to be observed when the measure is executed and employs either the traffic flow data DB or the traffic flow data DA depending on the execution necessity. For example, the traffic flow data DA is employed in response to determining that the execution of the measure is not necessary, and the traffic flow data DB is employed in response to determining that the execution of the measure is necessary. The generated learning data becomes data that simulates the traffic flow data actually observed through the vehicle sensor 300 when the measure is executed.

The learning unit 208 learns the machine learning model by using the generated learning data. Note that the number of the learned machine learning model(s) may be one or plural. Hereinafter, as one example, plural different machine learning models are each learned, one of the machine learning models having higher performance than the other machine learning models is selected, and the selected machine learning model is used for deduction.

The learning unit 208 learns plural machine learning models for estimating the effects of the measure by using the learning data. The machine learning model may be any model, and, for example, a model such as Causal Forest can be applied. The plural machine learning models may be plural Causal Forest models having different structures (for example, the number of branching) or may include one or more Causal Forest model(s) and one or more machine learning models using a method different from Causal Forest.

The evaluation unit 209 evaluates the performance of the machine learning model by comparing an estimation result E1 of the effects of the measure obtained by the learned machine learning model and an estimation result E2 of the effect of the measure obtained by the estimation unit 206. In one embodiment, the evaluation unit 209 calculates, as the performance of the machine learning model, an index representing the difference between the estimation result E1 and the estimation result E2 for each of the machine learning models. The index is, for example, root mean squared error (RMSE) of the estimation result E1 and the estimation result E2, but may be calculated by any of other methods. Note that the estimation result E1 and the estimation result E2 are estimated by using, for example, the traffic flow data different from the learning data.

The evaluation unit 209 selects the machine learning model with higher performance than the other machine learning models (for example, the machine learning model corresponding to the index with the smallest difference), as the machine learning model used in the deduction by the deduction unit 211. In this manner, the evaluation unit 209 can select the machine learning model capable of obtaining the estimation result closest to the effects of the measure estimated by the estimation process (effects estimated by the estimation unit 206) different from that of the machine learning model. In other words, the performance of the machine learning model can be verified by using, as correct data, the effects obtained by the estimation process that is different from a process using the machine learning model.

In the case where a single machine learning model is used, the evaluation unit 209 is only required to include at least a function of evaluating the performance of the single machine learning model. More specifically, the evaluation unit 209 evaluates the performance of the single machine learning model by comparing the effects estimated by the estimation unit 206 and the effects estimated by the learned single machine learning model.

The learning unit 210 learns the model that has been selected by the evaluation unit 209, by using the learning data. The learning data used in this process is the traffic flow data (measure-operation traffic flow data) that is transmitted from the vehicle sensor 300 and stored in the storage unit 121 when the measure is executed.

The deduction unit 211 deduces the effects of the measure that has started operating, by inputting the measure-operation traffic flow data to the machine learning model learned by the learning unit 210.

The units (the information generation unit 101, the output control unit 102) in the management system 100 illustrated in FIG. 1 and the units (the acquisition unit 201, the data-without-measure generation unit 202, the determination unit 203, the reception unit 204, the data-with-measure generation unit 205, the estimation unit 206, the learning-data generation unit 207, the learning unit 208, the evaluation unit 209, the learning unit 210, and the deduction unit 211) in the estimation system 200 illustrated in FIG. 2 are implemented, for example, by one or more hardware processors. For example, each of the above described units may be implemented by causing a processor such as a central processing unit (CPU) to execute a program, in other words, by software. Each of the above described units may be implemented by a processor such as a dedicated integrated circuit (IC), in other words, by hardware. Each of the above described units may be implemented by a combination of software and hardware. In a case where plural processors are used, each of the processors may realize one of the units or two or more of the units.

Next, the estimation process by the estimation system 200 according to the present embodiment will be described.

Figure 4:
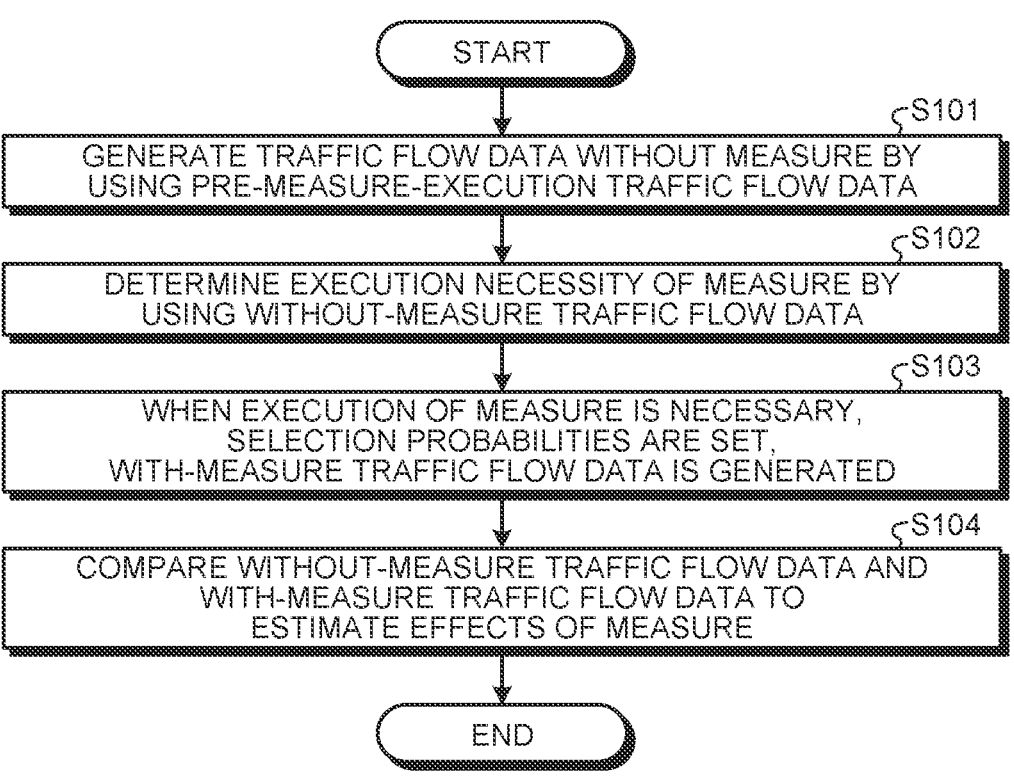
FIG. 4 is a flow chart of an estimation process.

FIG. 4 is a flow chart illustrating an example of the estimation process in the present embodiment. The estimation process in FIG. 4 is a process of estimating the effects of the measure by comparing the traffic flow data DA and the traffic flow data DB.

The data-without-measure generation unit 202 generates the traffic flow data DA of the case where the measure is not executed by using the pre-measure-execution traffic flow data acquired by the acquisition unit 201 (step S101).

The determination unit 203 determines the execution necessity of the measure by using the generated traffic flow data DA (step S102).

In response to determining that the execution of the measure is necessary, the data-with-measure generation unit 205 sets the selection probabilities of roads received by the reception unit 204 as the parameters of the traffic flow simulator and generates the traffic flow data DB of the case where the measure is executed (step S103).

The estimation unit 206 estimates the effects of the measure by comparing the traffic flow data DA and the traffic flow data DB (step S104).

Next, a model evaluation process by the estimation system 200 will be described.

Figure 5:
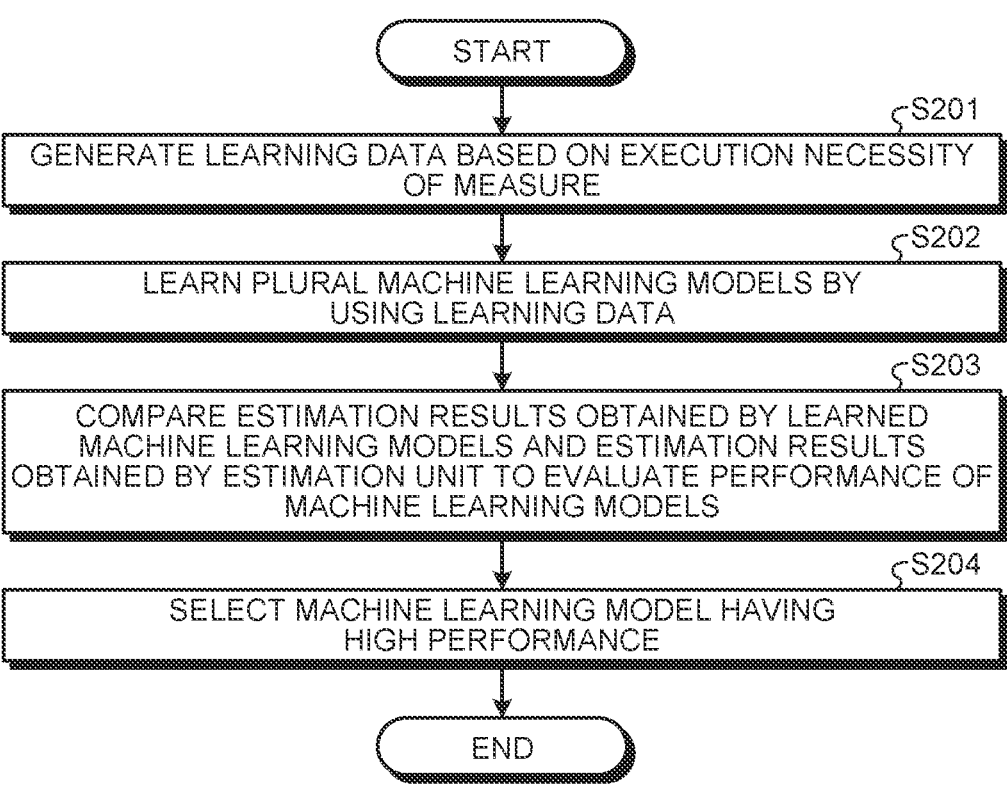
FIG. 5 is a flow chart of a model evaluation process.

FIG. 5 is a flow chart illustrating an example of the model evaluation process in the present embodiment.

The learning-data generation unit 207 generates the learning data by using the determination result of the execution necessity of the measure obtained by the determination unit 203 (step S201). For example, the learning-data generation unit 207 generates learning data including the traffic flow data DA corresponding to the determination that the execution of the measure is not necessary and the traffic flow data DB corresponding to the determination that the execution of the measure is necessary.

The learning unit 208 learns each of the machine learning models by using the generated learning data (step S202).

The evaluation unit 209 compares the estimation results of the effects of the measure obtained by the plural learned machine learning models and the estimation results of the effects of the measure obtained by the estimation unit 206, and evaluates the performance of each of the machine learning models (step S203).

The evaluation unit 209 selects the machine learning model having higher performance than the other machine learning models (step S204).

Next, a deduction process carried out by the estimation system 200 will be described. The deduction process is a process of estimating the effects of the measure with respect to the measure-operation traffic flow data by using the machine learning model having the evaluated performance.

Figure 6:
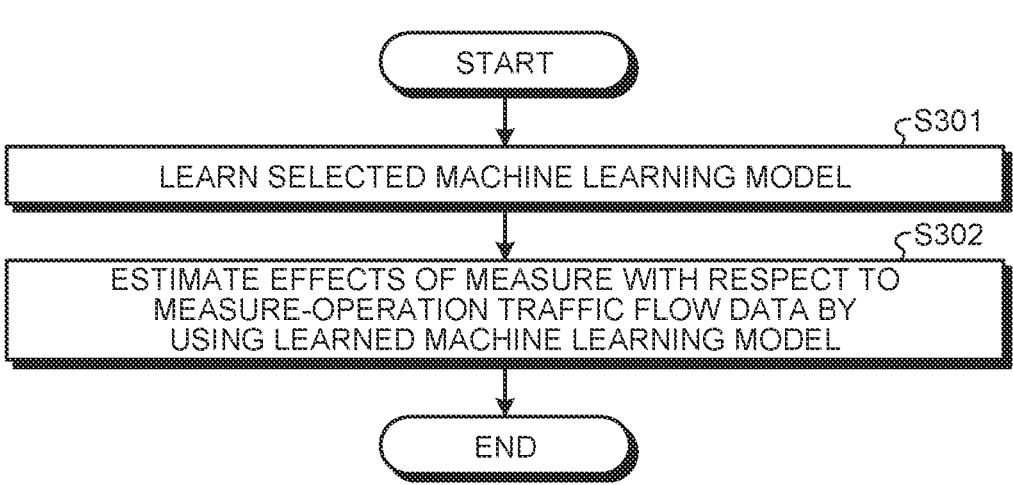
FIG. 6 is a flow chart of a deduction process.

FIG. 6 is a flow chart illustrating an example of the deduction process in the present embodiment.

First, the learning unit 210 learns the selected machine learning model by using the measure-operation traffic flow data as the learning data (step S301). In this manner, the machine learning model whose performance has been evaluated is further learned by using the traffic flow data obtained after the measure is actually started.

The deduction unit 211 estimates, by using the learned machine learning model, the effects of the measure with respect to the measure-operation traffic flow data obtained after the learning (step S302).

In this manner, according to the present embodiment, the performance of the machine learning model is verified in advance by using the traffic flow data DB and the traffic flow data DA, and the machine learning model having the confirmed performance is subjected to learning of the effects of the measure of the case where the measure is executed by using the measure-operation traffic flow data. By virtue of this, appropriate estimation of the effects of the measure in the case where the measure is executed can be ensured.

For example, the output control unit 102 may cause the estimated effects of the measure to be displayed by a large display (the display device 401) provided in the traffic control room. In this manner, according to the present embodiment, in addition to the current traffic conditions (traffic congestion information, etc.), the traffic conditions of the case where the measure is executed or the traffic conditions of the case where the measure is not executed can be displayed by the display device 401 provided in, for example, the traffic control room.

The output control unit 102 may output the information necessary for actually executing the measure having the confirmed effects. In one embodiment, the output control unit 102 outputs an instruction of execution and necessary information for executing the measure such as a change of the display information with respect to the display device 401, a change of the traffic information output to the information provision terminal 402, a change of the media that provides information, and a change of the fee structure in the fee system 403.

Next, a hardware configuration of the information processing device (the management system 100, the estimation system 200) according to the embodiment will be described by using FIG. 7.

Figure 7:
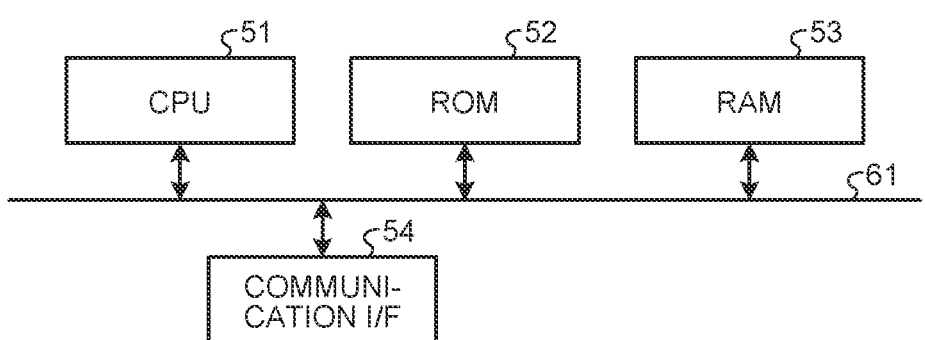
FIG. 7 is a hardware configuration diagram of an information processing device.

FIG. 7 is an explanatory diagram illustrating a hardware configuration example of the information processing device according to the embodiment.

The information processing device according to the embodiment is provided with a control device such as a CPU 51, storage devices such as a read only memory (ROM) 52 and a RAM 53, a communication I/F 54 that connects to a network and carries out communication, and a bus 61 that connects these units.

A computer program executed by the information processing device according to the embodiment may be provided in a manner that the program is installed in the ROM 52 or the like in advance.

The computer program executed by the information processing device according to the embodiment may be configured to be provided as a computer program product stored in a non-transitory computer-readable recording medium such as a compact disk read only memory (CD-ROM), a flexible disk (FD), a compact disk recordable (CD-R), a digital versatile disk (DVD), or the like, as a file in an installable format or in an executable format.

Moreover, the computer program executed by the information processing device according to the embodiment may be configured to be provided in a manner that the program is stored in a computer connected to a network such as the Internet and is downloaded via the network. Also, the program executed in the information processing device according to the embodiment may be configured to be provided or distributed via a network such as the Internet.

The computer program executed by the information processing device according to the embodiment may cause a computer to function as the above described units in the information processing device. In this computer, the CPU 51 can load the program from the computer-readable storage medium to a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more hardware processors configured to:
generate first data to be input to one or more models, each of the one or more models receiving input of traffic flow data and deducing an effect of a case where a measure is executed, the traffic flow data representing a traffic flow of plural roads on which a vehicle runs, the traffic flow data varying depending on whether the measure is executed or not, the first data representing the traffic flow data in a case where the measure is not executed;

receive input of one or more first parameters affecting the effect, each first parameter being a parameter used in a data estimation process of estimating second data representing the traffic flow data in a case where the measure is executed;

execute the data estimation process by using the first parameter and generate the second data;

estimate the effect by performing an effect estimation process of comparing the first data and the second data, the effect estimation process being different from a process of deducing the effect using the one or more models;

learn the one or more models by using learning data including the first data and the second data;

evaluate performance of each of the learned one or more models, by comparing a first effect and a second effect, the first effect being the effect esti- mated deduced by each of the learned one or more models, the second effect being the effect estimated by performing the effect estimation process;

select one of the learned one or more models having higher performance than other models;

apply the selected machine learning model to traffic flow data obtained when the measure is executed, to deduce the effect of the measure; and output, via a display device, the effect of the measure deduced by the selected machine learning model.

2. The information processing device according to claim 1, wherein the one or more hardware processors are con- figured to learn the selected model by using, as the learning data, the traffic flow data obtained in the case where the measure is executed.

3. The information processing device according to claim 1, wherein the one or more hardware processors receive input of one or more second parameters used in a process of estimating the traffic flow data of the case where the measure is not executed, and execute the process of estimating the traffic flow data of the case where the measure is not executed by using the received second parameter, and generate the first data representing traffic flow data esti- mated by the executed process.

4. The information processing device according to claim 1, wherein the one or more hardware processors are con- figured to determine whether the measure is to be executed, on the basis of the generated first data, and generate the second data in response to determining that the measure is to be executed.

5. The information processing device according to claim 1, wherein the first parameter includes respective selection probabili- ties of the plural roads, each of the selection probabili- ties indicating a probability that a corresponding road is selected.

6. The information processing device according to claim 1, wherein the one or more hardware processors are con- figured to evaluate the performance of the plural learned models by calculating a difference between the second effect and each of the first effect deduced by each of the plural models, and select one of the plural models having a smaller difference than the other models.

7. An information processing method implemented by a computer, the method comprising:

generating first data to be input to one or more models, each of the one or more models receiving input of traffic flow data and deducing an effect of a case where a measure is executed, the traffic flow data representing a traffic flow of plural roads on which a vehicle runs, the traffic flow data varying depending on whether the measure is executed or not, the first data representing the traffic flow data in a case where the measure is not executed;

receiving input of one or more first parameters affecting the effect, each first parameter being a parameter used in a data estimation process of estimating second data representing the traffic flow data in a case where the measure is executed;

executing the data estimation process by using the first parameter received by the receiving of input, and generating the second data;

estimating the effect by performing an effect estimation process of comparing the first data and the second data, the effect estimation process being different from a process of deducing the effect using the one or more models;

learning the one or more models by using learning data including the first data and the second data;

evaluating performance of the one or more models learned by the learning, by comparing a first effect and a second effect, the first effect being the effect deduced by the learned one or more models, the second effect being the effect estimated by performing the effect estimation process;

select one of the learned one or more models having higher performance than other models;

apply the selected machine learning model to traffic flow data obtained when the measure is executed, to deduce the effect of the measure; and output, via a display device, the effect of the measure deduced by the selected machine learning model.

8. A computer program product comprising a non-transi- tory computer-readable recording medium on which a pro- gram executable by a computer is recorded, the program instructing the computer to:

generate first data to be input to one or more models, each of the one or more models receiving input of traffic flow data and deducing an effect of a case where a measure is executed, the traffic flow data representing a traffic flow of plural roads on which a vehicle runs, the traffic flow data varying depending on whether the measure is executed or not, the first data representing the traffic flow data in a case where the measure is not executed;

receive input of one or more first parameters affecting the effect, each first parameter being a parameter used in a data estimation process of estimating second data rep- resenting the traffic flow data in a case where the measure is executed;

execute the data estimation process by using the received first parameter and generate the second data;

estimate the effect by performing an effect estimation process of comparing the first data and the second data, the effect estimation process being different from a process of deducing the effect using the one or more models;

learn the one or more models by using learning data including the first data and the second data; and evaluate performance of the learned one or more models, by comparing a first effect and a second effect, the first effect being the effect deduced by the learned one or more models, the second effect being the effect estimated by performing the effect estimation process;

select one of the learned one or more models having higher performance than other models;

apply the selected machine learning model to traffic flow data obtained when the measure is executed, to deduce the effect of the measure; and output, via a display device, the effect of the measure deduced by the selected machine learning model.

\* \* \* \* \*